United States Patent
Yoshida

(10) Patent No.: US 10,384,349 B2
(45) Date of Patent: Aug. 20, 2019

(54) PROCESSING ROBOT SYSTEM IN WHICH PROCESSING DEVICE IS CONNECTED TO ROBOT TO PERFORM PROCESSING

(71) Applicant: FANUC CORPORATION, Yamanashi (JP)

(72) Inventor: Shigeo Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/422,692

(22) Filed: Feb. 2, 2017

(65) Prior Publication Data
US 2017/0225335 A1 Aug. 10, 2017

(30) Foreign Application Priority Data
Feb. 9, 2016 (JP) .................................. 2016-022759

(51) Int. Cl.
| B25J 11/00 | (2006.01) |
| G06F 13/10 | (2006.01) |
| B25J 9/16 | (2006.01) |

(52) U.S. Cl.
CPC .......... *B25J 11/005* (2013.01); *B25J 9/1692* (2013.01); *G06F 13/107* (2013.01); *G05B 2219/25217* (2013.01); *G05B 2219/31103* (2013.01)

(58) Field of Classification Search
CPC ....... B25J 11/005; B25J 9/1656; G06F 13/107
See application file for complete search history.

(56) References Cited

U.S. PATENT DOCUMENTS

| 7,242,995 B1* | 7/2007 | Morgenson .......... G05B 19/418 700/103 |
| 2003/0100957 A1* | 5/2003 | Chaffee ................ G05B 19/042 700/18 |
| 2005/0244260 A1* | 11/2005 | Deplano ................ B25J 19/005 414/730 |
| 2010/0211220 A1* | 8/2010 | Nishi ............... G05B 19/41825 700/248 |

FOREIGN PATENT DOCUMENTS

| CN | 101804632 A | 8/2010 |
| CN | 103158156 A | 6/2013 |
| JP | 2002-91518 A | 3/2002 |

(Continued)

*Primary Examiner* — Rachid Bendidi
(74) *Attorney, Agent, or Firm* — Hauptman Ham, LLP

(57) ABSTRACT

A processing robot system includes a connection setting information group storage device provided inside a robot control device, a teaching operation panel, and a PC. The connection setting information group storage device stores a connection setting information group including information on settings for a digital communication standard between a processing device and the robot control device, and information on the allocation of I/O signals to be transmitted between the processing device and the robot control device via digital communication and which outputs the connection setting information group as one file. The teaching operation panel and the PC have a screen on which each piece of setting information included in the connection setting information group can be displayed and edited. Such a processing robot system can easily make settings for connection with a digital-controlled processing device.

12 Claims, 2 Drawing Sheets

(56) References Cited

FOREIGN PATENT DOCUMENTS

| JP | 2010-191602 A | 9/2010 |
|----|---------------|--------|
| JP | 2011-186607 A | 9/2011 |
| JP | 2014-520671 A | 8/2014 |
| JP | 2014-215781 A | 11/2014 |
| WO | 2005/114344 A1 | 12/2005 |

* cited by examiner

PROCESSING ROBOT SYSTEM IN WHICH PROCESSING DEVICE IS CONNECTED TO ROBOT TO PERFORM PROCESSING

RELATED APPLICATIONS

The present application claims priority to Japanese Patent Application No. 2016-022759 filed Feb. 9, 2016, the disclosure of which is hereby incorporated by reference herein in its entirety.

BACKGROUND OF THE INVENTION

1. Field of the Invention

The present invention relates to a processing robot system in which a processing device is connected to a robot, for example, an industrial robot, to perform processing.

2. Description of the Related Art

A processing robot system, in which a processing device is connected to an industrial robot in order to perform processing, has been known (see, for example, Japanese Translation of PCT International Application Publication No. 2014-520671). The processing device in the processing robot system is provided with a processing tool mounted on a tip end of the robot, and is configured to control processing sequences executed by the processing tool in accordance with commands from a control device of the robot.

If the processing device is an analog-controlled device, as long as an operator correctly connects wires of the processing device and a robot control device, a communication setting between the processing device and the robot control device is automatically completed. In the analog-controlled processing device, adjustable parameters are limited, and accordingly, the operator's workload for setting parameters for controlling the processing device via the robot control device is relatively small. In other words, in the robot control device connected to the analog-controlled processing device, the load applied on the operator to perform a setting operation is relatively small.

In recent years, many digital-controlled devices have been widely used as processing devices connected to an industrial robot, and connecting a robot control device and a processing device via digital communication has become common. Processing devices, to which open or standardized field bus communication standards are applied on the assumption that digital-controlled processing devices may be connected to robot control devices made by different robot manufacturers, have rapidly spread in the market. Examples of the field bus communication standards include DeviceNet (registered trademark), EtherNet/IP (registered trademark), or PROFIBUS (registered trademark). In a robot control device connected to such digital-controlled processing devices, a communication setting corresponding to the field bus communication standard for each processing device is necessary.

Almost all of these digital-controlled processing devices are configured to be capable of switching a plurality of processing sequence control methods depending on every object to be processed, thereby enabling one processing machine to perform a plurality of operations. Digital-controlled processing devices have various functions in comparison with analog-controlled processing devices, and serve a wide variety of functions, which can be adjusted from a robot control device, and parameters. Consequently, in a robot control device connected to a digital-controlled processing device, a burden on the operator when the operator makes a setting to control the processing device is large.

Thus, auto-setup software for automating settings for connection with a specific model of the processing device made by a specific manufacturer is preinstalled in the robot control device.

Further, in communication between a robot control device and a digital-controlled processing device, converting digital signals to analog signals by digital-analog conversion causes communication hardware or connection setting software to be simplified.

The problems of the aforementioned conventional technologies will now be described.

In processing devices for analog communication, even when the manufacturer or model of a processing device is changed, making communication settings between the processing device and a robot control device is not necessary for the software in the robot control device. In contrast, in processing devices for digital communication, making different communication settings depending on the type of field bus communication standard for each processing device is necessary for the communication software in the robot control device. In these digital communication settings, a standard value is preset in the processing device, and making a communication setting corresponding to the standard value is necessary for the robot control device.

Regarding I/O signals to be transmitted between the processing device and the robot control device via the field bus communication, the relationship between the sequence of the signals and the objects to be controlled is not standardized, and varies depending on the manufacturer or model of each processing device. Thus, in the robot control device, an operation for setting the allocation of I/O signals in accordance with the information disclosed by the manufacturer of each processing device (called "I/O mapping") is needed.

When all of the settings for communication and control in the robot control device are manually made as described above, a plurality of setting items necessary for setting are displayed on various screens in conventional software of the robot control device, and are difficult to find. Thus, only an operator with extensive knowledge about the software of the robot control device connected to a processing device can manually and easily make settings.

When the settings are successfully made, setting data backed up by the software of the robot control device may be developed on a robot control device of another processing robot system. However, in the conventional software for robot control devices, various pieces of the setting information are backed up, as a plurality of different files, for every functional category of the robot control device. In this respect, setting information having no relationship to communication between the robot control device and the processing devices is filed at the same time in some cases. This increases the difficulty of identifying the backed-up file, which can be used to return the current setting to the previous setting that was successfully made, when the communication between the robot control device and the processing devices is executed. In this situation, unnecessary settings having no relationship to the connection between the robot control device and the processing devices are made in some cases. Thus, even when the settings which are manually made as described above can be used in one processing robot system, it is difficult to move the same settings to another processing robot system.

When all of the specifications of a processing device to be connected to a robot control device are disclosed, auto-setup software for automating settings for connection with the processing device can be developed and installed in the robot control device in advance. However, there are many manufacturers or models of processing devices in the world, and accordingly, it is difficult to develop auto-setup software for all of the processing devices and install the same in the robot control device in advance, and an enormous development cost is needed. Additionally, updating the auto-setup software depending on changes in specifications of a processing device to be connected is needed, and accordingly, an enormous software maintenance cost is needed.

In the processing robot system in which communication is executed using analog signals converted by a digital-analog converter, settings for connection with a processing device are simplified, but the robot control device cannot control various functions provided in a digital-controlled processing device.

Conventional processing robot systems provided with processing devices, which execute digital communication, have the problems described above. However, interfaces for industrial robots, which can easily make settings for connection with digital-controlled processing devices of each manufacturer adopting open field bus communication standards, have not yet been established. Depending on a combination between the robot control device and processing devices connected thereto, a trained operator and an enormous setting time are needed every time when an operation for connecting the robot control device and processing devices is performed.

SUMMARY OF THE INVENTION

The present invention provides a processing robot system including a robot control device which can easily make settings for connection with a digital-controlled processing device.

According to a first aspect of the present disclosure, there is provided a processing robot system including a processing device which carries out a processing sequence using a processing tool, by digital control, a robot for moving the processing tool, a robot control device for controlling an operation for positioning the robot, and controlling the processing device via digital communication, a storage device which stores a connection setting information group including information on settings for a digital communication standard between the processing device and the robot control device, and information on the allocation of I/O signals to be transmitted between the processing device and the robot control device via digital communication and which outputs the connection setting information group as one file, and an editing device having a screen on which each piece of setting information included in the connection setting information group can be displayed and edited.

According to a second aspect of the present disclosure, in the processing robot system according to the first aspect, the robot control device reads the file, thereby completing settings for communication with and control of the processing device.

According to a third aspect of the present disclosure, in the processing robot system according to the first or second aspect, the editing device is a teaching operation panel or a PC, which is connected to the robot control device and which has the screen.

According to a fourth aspect of the present disclosure, in the processing robot system according to any of the first to third aspects, the connection setting information group includes information on settings for a processing command parameter corresponding to every processing sequence control method.

According to a fifth aspect of the present disclosure, in the processing robot system according to any of the first to fourth aspects, the connection setting information group includes information on settings for processing sequence control.

According to a sixth aspect of the present disclosure, in the processing robot system according to any of the first to fifth aspects, the connection setting information group includes information on the code number of an alarm for the processing device and the contents of a message corresponding to the code number.

According to a seventh aspect of the present disclosure, in the processing robot system according to any of the first to sixth aspects, the file is a file having readability.

BRIEF DESCRIPTION OF THE DRAWINGS

These objects, features, and advantages of the present invention and other objects, features, and advantages will become more apparent from the detailed description of typical embodiments illustrated in the appended drawings.

DETAILED DESCRIPTION

Figure 1:
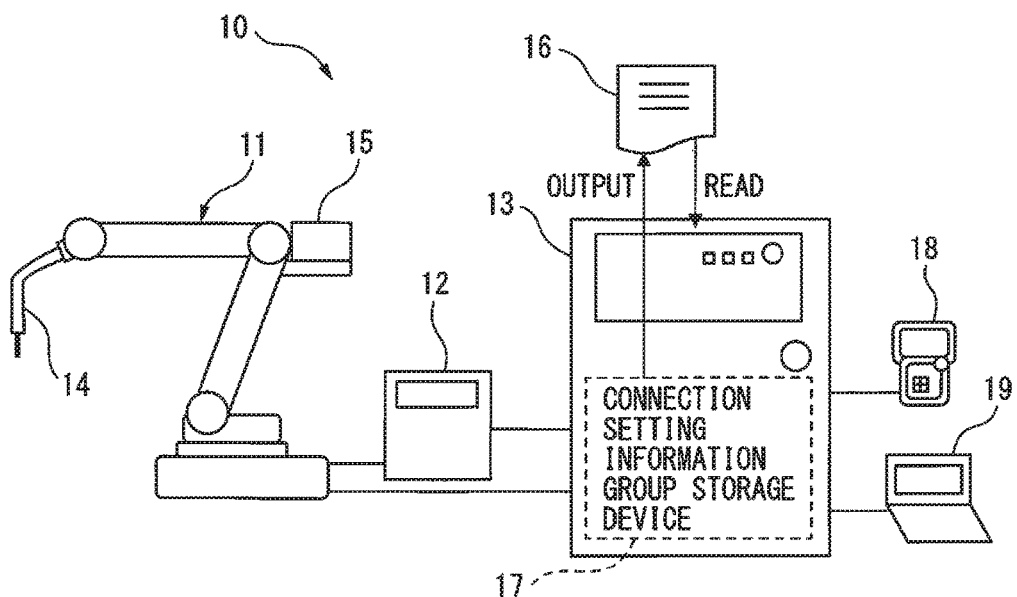
FIG. 1 is a schematic view of the configuration of a processing robot system according to an embodiment.

Embodiments of the present disclosure will be described below with reference to the accompanying drawings. In the following figures, similar members or function parts are designated with the same reference numerals. Components designated with the same reference numeral in the different figures are meant to be components having the same function. These figures are properly modified in scale to assist the understanding thereof. The configurations shown in the figures are examples, and the present invention is not limited to the illustrated configurations.

FIG. 1 is a view of the configuration of a processing robot system according to an embodiment.

As shown in FIG. 1, a processing robot system 10 according to this embodiment includes a robot 11, a processing device 12, and a robot control device 13.

The robot 11 is an industrial robot, for example, a vertical articulated robot. A detachable processing tool 14 is attached to a tip end of an arm of the robot 11. The robot 11 moves the processing tool 14 in accordance with a command from the robot control device 13.

The processing device 12 is a device which carries out a processing sequence using the processing tool 14, by digital control, and is, for example, a welding power source (also referred to as "arc welding machine") for supplying power to a welding torch. In FIG. 1, an arc welding robot is illustrated as the robot 11, and the processing tool 14 is a welding torch. A wire feeding device 15 for feeding a welding wire to the welding torch is installed in the robot 11 as an arc welding robot. Of course, the robot 11 is not limited to such an arc welding robot, and may be, for example, a robot for performing a processing sequence, e.g., laser welding, laser cutting, or plasma cutting.

The robot control device 13 controls an operation for positioning the robot 11 while controlling the processing device 12 via digital communication. Specifically, the robot control device 13 controls a servomotor (not shown) for driving each axis of the robot 11, in order to position the processing tool 14. The robot control device 13 also outputs a processing sequence control command to the processing device 12. The robot control device 13 is also configured to read a library file 16 that will be described later, thereby completing settings for connection with the processing device 12.

A connection setting information group storage device 17 for storing a plurality of pieces of setting information (hereinafter referred to as "connection setting information group") on various settings for connection with the processing device 12 is provided inside the robot control device 13.

Various pieces of setting information of the connection setting information group stored in the connection setting information group storage device 17 can be displayed on a display of a teaching operation panel 18 or a personal computer (hereinafter abbreviated as "PC") 19, which will be described later, and can be edited. The connection setting information group storage device 17 can output, as one library file 16, the edited connection setting information group to the outside of the robot control device 13. Note that, in the configuration shown in FIG. 1, the connection setting information group storage device 17 is provided inside the robot control device 13, but may be provided outside the robot control device 13.

The teaching operation panel 18 is communicably connected to the robot control device 13, and is a device by which the operator teaches the operation of the robot 11. The teaching operation panel 18 is also provided with an input part for setting processing sequence control commands, e.g., control parameters for the processing device 12, and a display for displaying a screen of a graphical user interface (hereinafter abbreviated as "GUI"). Examples of the input part include a keyboard, a keypad, and a dial. Examples of the display include a liquid crystal panel and a LED panel. The GUI screen of the display indicates setting information on communication between and control of the processing device 12 and the robot control device 13. The operator can edit the setting information displayed on the GUI screen while viewing the same.

The PC 19 can be communicably connected to the robot control device 13. When the PC 19 is connected to the robot control device 13, as in the teaching operation panel 18, the setting information on communication with and control of the processing device 12 is displayed on the GUI screen of the display of the PC 19. Thus, the operator can edit the setting information displayed on the GUI screen while viewing the same, as in the teaching operation panel 18. In other words, the teaching operation panel 18 and the PC 19 are editing devices each having a GUI screen for displaying and editing the various pieces of the setting information.

The library file 16 is a file obtained by collecting various pieces of the setting information necessary to connect the processing device 12 with the robot control device 13. The library file 16 is output from the connection setting information group storage device 17 to the outside of the robot control device 13. If another processing robot system similar to the processing robot system 10 shown in FIG. 1 is provided, the library file 16 can be read into a robot control system of this processing robot system. In this instance, it is unnecessary to make settings for connection between the robot control device and processing devices again in this processing robot system.

Figure 2:
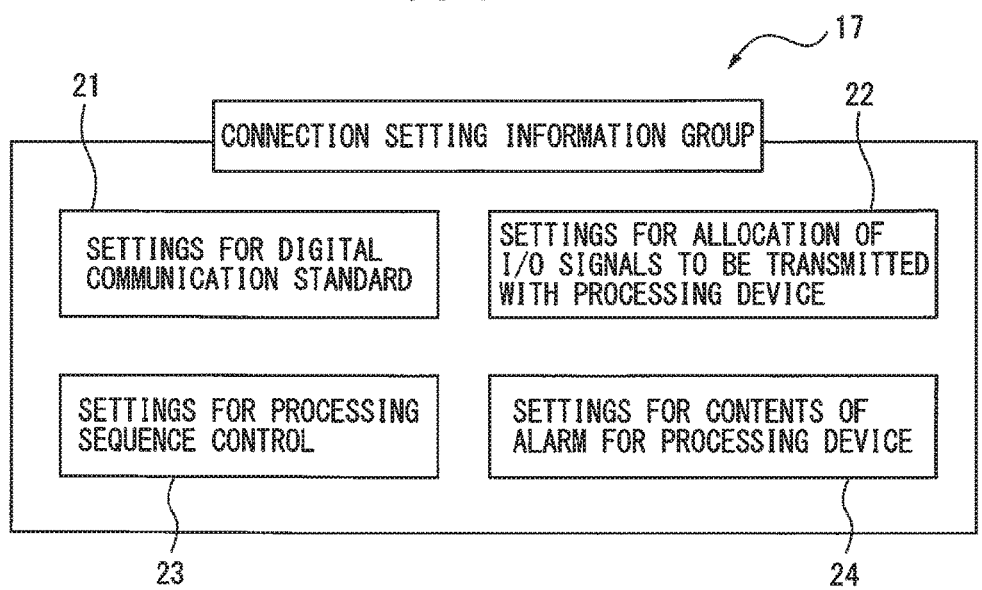
FIG. 2 is a view of a specific example of a connection setting information group stored in a connection setting information group storage device.

FIG. 2 is a view of a specific example of a connection setting information group stored in the connection setting information group storage device 17 according to this embodiment. In FIG. 2, the connection setting information group includes information 21 on settings for the digital control standards between the processing device 12 and the robot control device 13. In other words, making different communication settings depending on the kind of field bus communication standard is necessary for the communication software in the robot control device 13, and the piece of information 21 set at this time is stored in the connection setting information group storage device 17.

Regarding the I/O signals to be transmitted between the processing device 12 and the robot control device 13 via the field bus communication, the relationship between the sequence of the signals and the objects to be controlled is not standardized. Thus, in the robot control device 13, an operation for setting the allocation of the I/O signals in accordance with the information disclosed by the manufacturer of a processing device (called "I/O mapping") is needed. Thus, a piece of information 22 set at this time is stored in the connection setting information group storage device 17.

The robot control device 13 is also required to set processing command parameters depending on a plurality of processing sequence control methods in the processing device 12. In addition, depending on the model of the processing device 12, there are differences in functions to be supported or sequence control for the start and end of processing. Consequently, registering recommended settings or adjustment values is necessary for every model of the processing device 12. A piece of information 23 set at this time is preferably stored in the connection setting information group storage device 17.

In addition, in the processing device 12 having no indicator, when an alarm is generated due to detection of an abnormality of the processing device 12, it is necessary to cause the indicator provided in the robot control device 13 to indicate the contents of the alarm. In such a case, the code number of the alarm in the processing device 12 and all of the contents of a message corresponding to the code number should be registered in the robot control device 13. A piece of information 24 set at this time is preferably stored in the connection setting information group storage device 17.

As described above, the pieces of information 21 to 24 for various connection settings are stored in the connection setting information group storage device 17. In other words, the management of the pieces of information 21 to 24 on settings for connection with the processing device 12 is consolidated in the connection setting information group storage device 17. The pieces of information 21 to 24 are displayed on the screen of the display of the teaching operation panel 18 or the PC 19. The various pieces of information 21 to 24 displayed on the screen can be edited, and accordingly, the settings for connection with the processing device 12 can be easily made. As shown in FIG. 1, the connection setting information group storage device 17 can consolidate the edited results and output the same as the library file 16 to the outside of the robot control device 13. Reading the previously made library file 16 into the robot control device 13 can cause the settings for connection with the processing device 12 to be completed. Further, reading the library file 16 into another robot control device different from the robot control device 13 eliminates the necessity to perform a connection setting operation again for this robot control device. Consequently, the start-up time for the processing robot system provided with another robot control device can be remarkably reduced.

Further, with reference to FIGS. 1 and 2, the operation of the processing robot system 10 will be specifically described. In an example, an arc welding robot will be described as the robot 11. Thus, the welding power source that will be described below corresponds to the processing device 12.

As described above, the connection setting information group storage device 17 is provided inside the robot control device 13 of the processing robot system 10. A special screen on which various pieces of setting information stored in the connection setting information group storage device 17 can be edited is displayed on the display of the teaching operation panel 18 or the PC 19 connected to the robot control device 13. The special screen has a top page, and settings screens corresponding to various settings can be switched from the top page and displayed.

Figure 3:
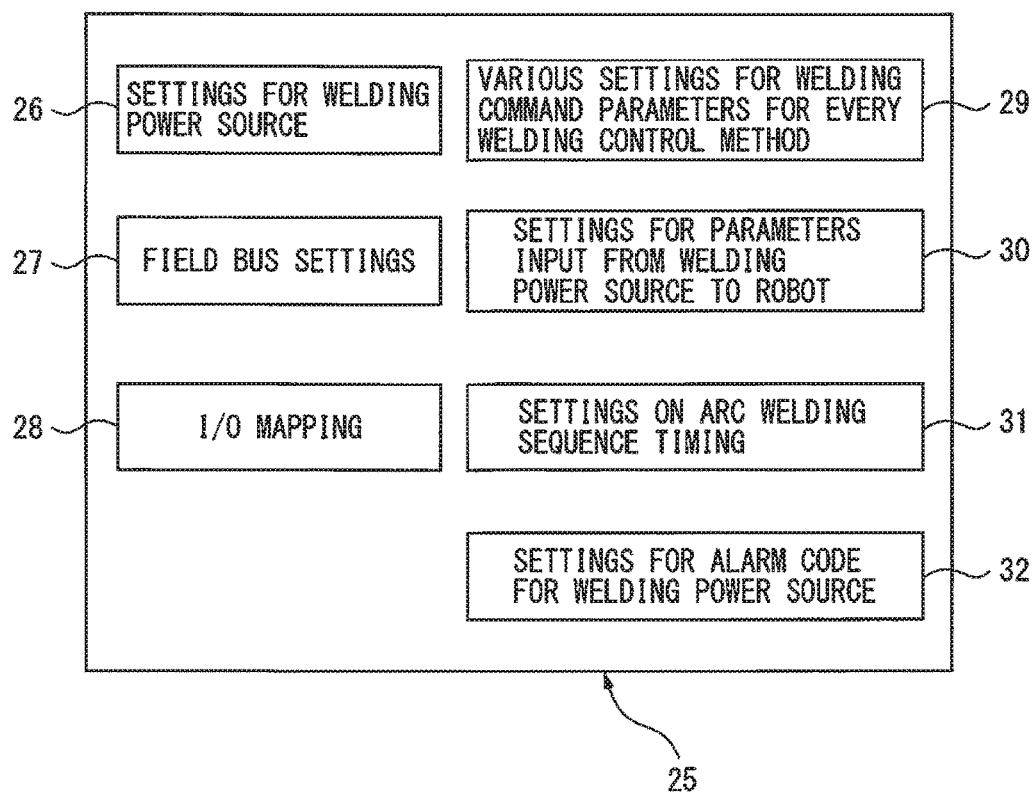
FIG. 3 is a view of an example of the top page of a screen for editing connection setting information, which is displayed on a display of a teaching operation panel or PC.

In this respect, FIG. 3 is a view of an example of the top page of a screen 25 for editing the connection setting information, which is displayed on the display of the teaching operation panel 18 or the PC 19. It is preferable that, as shown in FIG. 3, buttons 26 to 32 corresponding to various settings below are prepared on the screen 25. The screen 25 is prepared by a GUI.

Settings for the welding power source
Field bus settings
I/O mapping
Various settings for welding command parameters for every welding control method
Settings for parameters input from the welding power source to the robot
Settings on arc welding sequence timing
Settings for alarm codes for the welding power source When such various settings are made, the operator selects a target setting button from among the buttons 26 to 32 on the screen 25, using, for example, a key operation or a mouse operation. This causes a setting screen corresponding to the target setting to open.

In, for example, the setting screen corresponding to "Settings for the welding power source" described above, the manufacturer name and model name of the welding power source, the name of the wire feeding device, the class of the field bus communication standard, etc., can be set.

In the setting screen corresponding to "Field bus settings" described above, the contents of settings are changed depending on the class of the field bus communication standard applied to the welding power source. When, for example, DeviceNet (registered trademark) is selected as the field bus communication standard, the machine identifications and vendor identifications of the welding robot and the welding power source, the input/output size of I/O signals, etc., can be set.

In the setting screen corresponding to "I/O mapping" described above, the relationship between the sequence of I/O signals to be transmitted between the welding power source and the control device of the arc welding robot via field bus communication, and the intended object can be set. In an example, whether the first input signal is used as an arc-on command or a gas-on command can be set.

In the setting screen corresponding to "Various settings for welding command parameters for every welding control method" described above, the name and number specific to each welding control method can be set. Further, welding command parameters necessary for each welding control method can be set. Examples of typical welding command parameters mainly include voltage or current during welding, wire feeding speed, etc. In addition, depending on the manufacturer of the welding power source, parameters specific to the welding power source are prepared in some cases. The combination of these parameters varies depending on the welding control method, and accordingly, should be set. Further, possible command ranges are defined for these welding command parameters. When each parameter is transmitted to the welding power source via field bus communication, the conversion of the value of the parameter is needed in some cases, and accordingly, information on this conversion, for example, scaling information, can be set.

In the setting screen corresponding to "Settings for parameters input from the welding power source to the robot" described above, current values or voltage values actually measured during welding can be mainly set. Regarding these parameters, as in the welding command parameters, the definition of the input range, and the information on the conversion of the value of the parameter received by the robot via the field bus communication, for example, the scaling information, can be set.

In the setting screen corresponding to "Settings on arc welding sequence timing" described above, for example, a delay time from when the robot control device transmits a welding detection command to the welding power source until it receives a response signal from the welding power source, is set. A method for conveying a time at which a welding operation performed by the welding power source is ended, to the robot control device, is set.

In the setting screen corresponding to "Settings for alarm codes for the welding power source" described above, the code number of an alarm prescribed for each welding power source, and a message corresponding to the code number can be set.

Note that, in this embodiment, as described above, a plurality of setting screens corresponding to various settings are prepared, and a plurality of setting items necessary for various settings are collectively displayed on each setting screen. Thus, various setting operations are easily performed.

After the various settings described above are completed, the operator pushes an output button (not shown) on the screen 25 by, for example, a key operation or mouse operation. This causes the library file 16 (see FIG. 1) including all setting data to be output to one destination to save. This destination to save may be provided in the connection setting information group storage device 17 comprised of a memory within the robot control device 13, or may be provided in an external storage device disposed outside the robot control device 13. Examples of the external storage device preferably include a stationary disk device, such as a hard disk, or a portable storage device, such as a flexible disk, an optical disk, etc.

The library file 16 that has been output is a file having readability, to which a highly flexible format is applied. An XML format file is adopted here. Such an XML file enables the operator to understand the set contents from the screen 25 as a GUI of the teaching operation panel 18 or PC 19, and to easily correct the set data.

When the set data are read from the screen 25, i.e., the GUI after being corrected, all of the set data that have been corrected are collectively reflected in the connection setting information group storage device 17 within the robot control device 13. After that, when both the welding power source (processing device 12) and the robot control device 13 are turned on, intercommunication between the welding power source (processing device 12) and the robot control device 13 is automatically established. Subsequently, outputting an arc welding command from the robot control device 13 for the arc welding robot causes the welding power source to output voltage or current corresponding to the command.

Further, in this embodiment, the library file 16 can be read into a robot control device for controlling an arc welding robot different from the arc welding robot (robot 11) shown in FIG. 1. This causes all settings on communication between and control for the control device for another arc welding robot and the welding power source to be completed without settings to be made by the operator. In short, performing a setting operation again for the control device for controlling another arc welding robot is not necessary. Consequently, the start-up time of the arc welding robot system is remarkably reduced. Subsequently, simply connecting the control device for another arc welding robot to the welding power source via a cable for field bus communication enables the control device for another arc welding robot to control the welding power source.

In the embodiments described above, the processing robot system 10 has been described using the arc welding robot system as an example. However, the processing robot system according to the present invention is not limited to the arc welding robot system, and can also be applied to processing robot systems for performing, for example, laser welding, laser cutting, plasma cutting, etc.

The present invention has been described above using exemplary embodiments. However, a person skilled in the art would understand that the aforementioned modifications and various other modifications, omissions, and additions can be made without departing from the scope of the present invention. Any appropriate combination of these embodiments is included in the scope of the present invention.

EFFECT OF THE INVENTION

The first aspect of the present disclosure is configured to store various pieces of setting information on settings for connection with the processing device in the connection setting information group storage device, and accordingly, can collectively manage various pieces of connection setting information. The editing device having the screen, on which the various pieces of connection setting information stored as described above can be displayed and edited, is provided, and accordingly, settings for connection with the processing device can be easily made. Further, the edited results can be consolidated as one file, and can be output to the outside of the connection setting information group storage device.

According to another aspect of the present disclosure, reading the file into the robot control device enables settings for connection with the processing device controlled by the robot control device to be completed. This eliminates the necessity to perform again a connection setting operation for the robot control device.

According to still another aspect of the present disclosure, using the teaching operation panel or the PC, which is connected to the robot control device, as the editing device eases various setting operations.

According to still another aspect of the present disclosure, the fact that the file has readability enables the operator to easily understand or correct the setting information in the file on the screen of the editing device.

What is claimed is:

1. A processing robot system, comprising:
   a processing device which carries out a processing sequence using a processing tool, by digital control;
   a robot for moving the processing tool;
   a robot control device for controlling an operation for positioning the robot, and controlling the processing device via digital communication;
   a storage device which stores a connection setting information group including information on settings for a digital communication standard between the processing device and the robot control device, and information on the allocation of I/O signals to be transmitted between the processing device and the robot control device via digital communication and which outputs the connection setting information group as one file; and
   an editing device having a screen on which each piece of setting information included in the connection setting information group can be displayed and edited,
   wherein the screen comprises a setting screen, and in the setting screen contents of the setting information are set and changed depending on a class of a field bus communication standard applied to the processing device as the digital communication standard.

2. The processing robot system according to claim 1, wherein the robot control device reads the file, thereby completing settings for communication with and control of the processing device.

3. The processing robot system according to claim 1, wherein the editing device is a teaching operation panel or a PC, which is connected to the robot control device and which has the screen.

4. The processing robot system according to claim 1, wherein the connection setting information group includes information on settings for a processing command parameter corresponding to every processing sequence control method for performing an operation to a respective one of objects to be processed by the robot.

5. The processing robot system according to claim 1, wherein the connection setting information group includes information on settings for processing sequence control.

6. The processing robot system according to claim 1, wherein the connection setting information group includes information on a code number of an alarm for the processing device and the contents of a message corresponding to the code number.

7. The processing robot system according to claim 1, wherein the file is a file having readability to which a flexible format is applied to enable an operator to understand.

8. The processing robot system according to claim 1, wherein
   information on the allocation of I/O signals is set in accordance with information disclosed by a manufacturer of the processing device.

9. The processing robot system according to claim 1, wherein
   information on settings for the digital communication standard stored in the storage device includes different communication settings depending on a kind of field bus communication standard for communication software in the robot control device.

10. The processing robot system according to claim 1, wherein
    management of information on settings for connection with the processing device is consolidated in the connection setting information group stored in the storage device.

11. The processing robot system according to claim 1, wherein the storage device is configured to consolidate an edited result of each piece of setting information included in the connection setting information group and output the edited result as one file.

12. The processing robot system according to claim 1, wherein
the file output by the storage device is readable by a different robot control device.

* * * * *